US006618382B1

United States Patent
Divivier et al.

(10) Patent No.: US 6,618,382 B1
(45) Date of Patent: Sep. 9, 2003

(54) AUTO EARLY PACKET DISCARD (EPD) MECHANISM FOR AUTOMATICALLY ENABLING EPD ON AN ASYNCHRONOUS TRANSFER MODE (ATM) NETWORK

(75) Inventors: Robert J. Divivier, San Jose, CA (US); Christopher D. Bergen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/250,972

(22) Filed: Feb. 16, 1999

(51) Int. Cl.[7] ............................................... H04L 12/50
(52) U.S. Cl. .................................... 370/395.5; 370/465
(58) Field of Search ................................ 370/229, 230, 370/231, 235, 236, 395.1, 395.5, 395.65, 905, 389, 351, 352, 465, 468, 399, 395.6, 395.41, 395.32, 428, 411, 412–419

(56) References Cited

U.S. PATENT DOCUMENTS 5,764,641 A    6/1998    Lin
6,282,171 B1 *   8/2001    Adams et al. ............... 370/229
6,345,037 B2 *   2/2002    St-Denis et al. ............ 370/230

OTHER PUBLICATIONS

Y. Li and S. Elby. TCP/IP Performance and Behavior Over an ATM Network. 1996 IEEE. pp. 1–9.*
H. Chiou and Z. Tsai. Performance of ATM Switches with Age Priority Packet Discarding under the ON–OFF Source Model. 1998 IEEE. pp. 931–938.*
M. Casoni. Early Packet Discard with Diverse Management Policies for EOM Cells. 1997 IEEE. pp. 33–37.*
Nathan Harwell, TCP Over ATM, Internet Web Site, Nov. 5, 1998, 5, http://ils.unc.edu/atm/.

* cited by examiner

Primary Examiner—Dang Ton
(74) Attorney, Agent, or Firm—Blakeey, Sokoloff, Taylor & Zafman LLP

(57) ABSTRACT

A method for automatic early packet discard mode enabling early packet discard on a cell switching network is disclosed. The method includes the steps of counting every non-end of the frame data cell that arrives on a network connection, comparing the number of non-end of the frame data cell to a predetermined threshold value to determine whether the traffic arriving on the network connection is a frame based traffic and enabling early packet discard if the traffic is frame based.

54 Claims, 6 Drawing Sheets

| FD_ENB | CONNECTION'S ASSUMED FROM TYPE |
|--------|-------------------------------|
| 0      | NON-FRAME BASED               |
| 1      | FRAME BASED                   |

| FD_ENB | DIS_AUTO_EPD | CONNECTION'S FROM TYPE | |
|---|---|---|---|
| 0 | X | NON-FRAME BASED | OPTIONAL |
| 1 | 0 | AUTO EPD | MANDATORY |
| 1 | 1 | FRAME BASED | OPTIONAL |

504 = FD_ENB; 502 = DIS_AUTO_EPD; MATRIX 500

AUTO EARLY PACKET DISCARD (EPD) MECHANISM FOR AUTOMATICALLY ENABLING EPD ON AN ASYNCHRONOUS TRANSFER MODE (ATM) NETWORK

FIELD OF THE INVENTION

The present invention is in the field of communication networks. In particular, the method and apparatus of one embodiment of the present invention is related to an auto-early packet discard mechanism for automatically enabling Asynchronous Transfer Mode (ATM) Adaption Layer 5 (AAL5) early packet discard on an ATM network.

BACKGROUND

Early Packet Discard (EPD) is used to increase bandwidth utilization in Internet Protocol (IP) networks. Current mechanisms for implementing EPD in ATM networks rely on a static configuration of altogether enabling or, disabling EPD.

FIG. 1a illustrates a static EPD configuration 10 where the, EPD is altogether turned on or off for a given network connection. The static EPD is implemented in ATM networks by detecting an End-Of-Frame (EOF) cell of an AAL5 packet by using the Payload Type Indicator (PTI) field of the ATM cell header. A single bit indicates if the cell is the EOF. A Start-Of-Frame (SOF) is inferred to be the next cell following the EOF cell.

FIG. 1b illustrates an exemplary network diagram. Network communication equipment 12 such as an ATM switch is used by a core service provider 11 that sells the use of a virtual connection (VC) 14 to his customers 15. In the illustrated embodiment, customer 15 may include an access service provider 16, who then sells the connection 14 to an end user 18. In the alternative, the core service provider 11 may act as an access service provider, in which case the customer 15 may be the end user 18.

In cases of multiple network hierarchy as illustrated in FIG. 1b, a service provider 11 may sell a connection to a second service provider 16, and therefore may not know the type of traffic that is going to be run across the connection 14. For example, the second service provider 16 may be selling the connection to an end user 18 using a voice application. For voice application, data types are not packet based but are encapsulated into single cells for transmission one cell at a time. This is in contrast to applications carrying a frame-based protocol, such as Internet Protocol (IP) traffic which encapsulates traffic onto ATM cells using what is referred to as the Asynchronous Transfer Mode (ATM) Adaption Layer 5 (AAL5). More specifically, AAL5 segments data packets into cells at the source of the ATM layer link, passes the cells to the ATM network for transmission and reassembles the cells back into data packets at the destination. When packets are converted into cells, multiple ATM cells are generated per packet, in which case only the last cell identifies the end of the data packet.

One disadvantage is that the service provider 11 does not know which data protocol is to be applied to the connection 14. Further, if a cell is to be discarded, it is more efficient to discard all of the cells belonging to that data packet at the point of discard (the original service provider 11) and free up the bandwidth downstream of that point within the service provider 11's network for other customer applications.

Given the currently available technology, a service provider must statically turn on the EPD feature of the communication equipment 12 to have the extra efficiency of the network bandwidth. However, if the EPD feature is turned on, but the end user 18 does not use frame-based traffic, and instead uses another type of traffic service, a discard of the first cell of the data packet responsive to any single cell discard leads to loss of connectivity of the data being transmitted. This is because the EPD feature continues to look for the indication to stop discarding by waiting for an EOF. Such indication never occurs since only AAL5 traffic uses the EOF indication bit in the ATM header. Thus, in order to take advantage of the EPD feature, a service provider is required to reconfigure a connection to turn EPD off every time the end user changes. However, in many cases the service provider may not know that the end user has changed, and thus the traffic protocol has changed. In these cases, it is not feasible for the service provider to apply the EPD feature to the communication equipment 12.

BRIEF SUMMARY OF THE INVENTION

A method for automatically enabling early packet discard mode on a cell switching network is disclosed. The method includes the steps of counting every non-end of the frame data cell that arrives on a network connection, comparing the number of non-end of the frame data cell to a predetermined threshold value to determine whether the traffic arriving on the network connection is a frame based traffic and enabling early packet discard if the traffic is frame based.

This amendment does not add new matter and is supported in the specification.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements in which.

DETAILED DESCRIPTION

A mechanism is described for automatically detecting if an ATM connection is carrying an AAL5 (frame based) traffic and enabling an automatic (auto) EPD mode only while such traffic is present.

For one embodiment, a cell queue controller is implemented with a counter per virtual connection (VC) that is incremented with every non-end of frame (EOF) cell and is cleared with every EOF cell. The maximum frame size for AAL5 is 65535 bytes, or about 1366 cells. If the cell counter exceeds a configurable predetermined threshold value such as 1366, then EPD is disabled. Additionally, as long as the cell counter is below the predetermined threshold value such as 1366, EPD is enabled. The predetermined threshold value may be changed to accommodate the possibility of an upstream mechanism that is discarding discrete cells.

The intended advantages of the embodiment include obviating the need for a service provider to turn on/off an EPD feature by automatically detecting the network traffic type and responsively turning the EPD feature on and off.

Figures 1A, 1B:
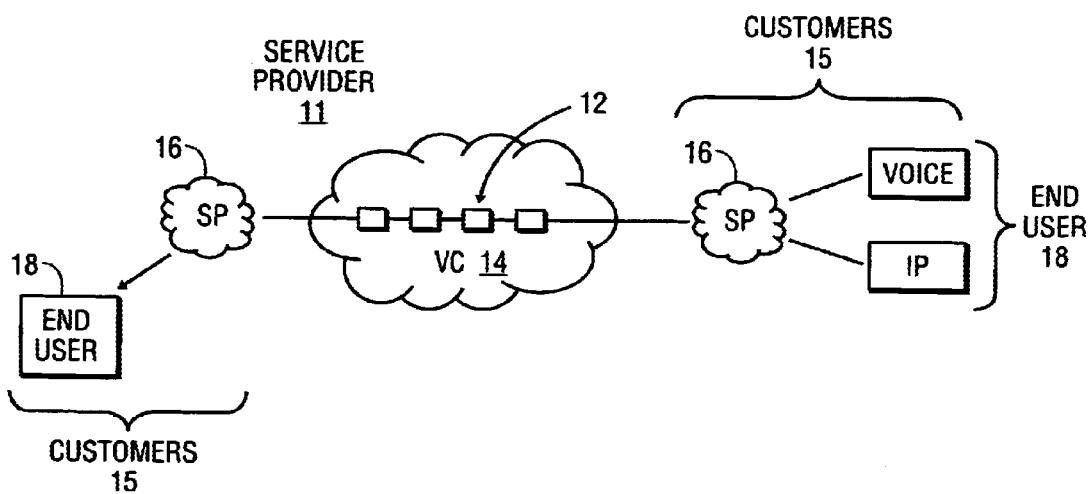
FIG. 1a shows the static EPD configuration.
FIG. 1b is an exemplary network diagram.
Figure 2:
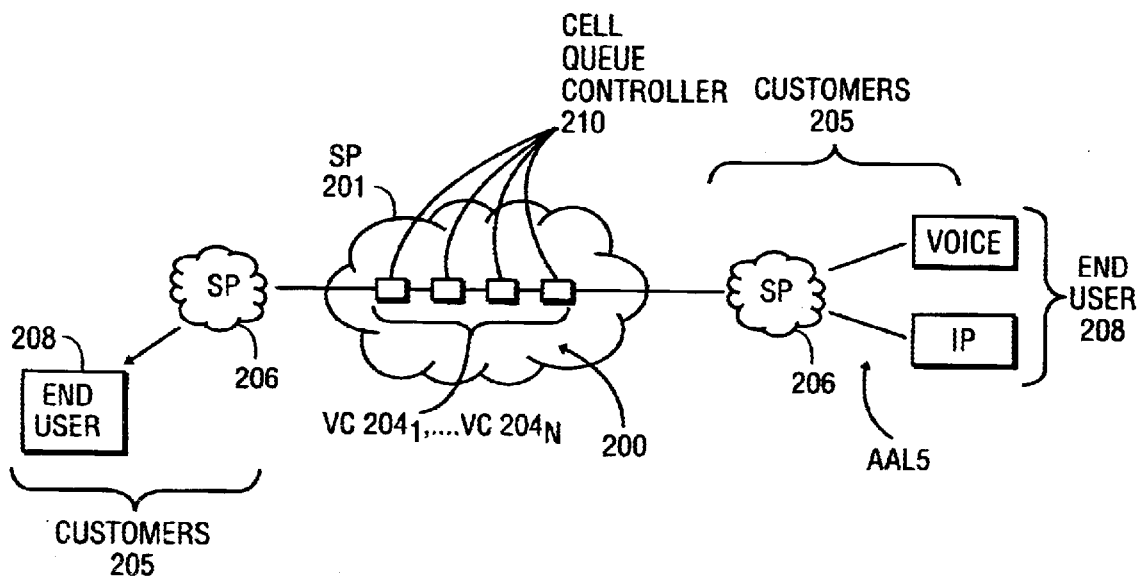
FIG. 2 is an exemplary network diagram.

FIG. 2 is an exemplary network diagram. A network communication equipment 200 such as an ATM Wide Area Network (WAN) routing hub switch (also referred to herein as an ATM switching unit) is used by a service provider 201 that sells the use of one or more of a plurality of virtual connections $VC204_1 \ldots VC204_N$ to his customers 205. In the illustrated embodiment, the core service provider 201's customer may include an access service provider 206, who may sell the connection 204 to an end user 208. In the alternative, the service provider 201 may sell the connection 204 directly to an end user 208.

For one embodiment, the auto-EPD mechanism for automatically detecting the network traffic type and responsively turning the EPD feature on and off resides in the ATM switching unit 200. The auto-EPD mechanism may be implemented with a cell queue controller (CQC) 210 that stores ATM cells in service queues based on routing decisions with thresholds on the quantity of cells that can be stored in any such service queue. The cell queue controller (CQC) 210 also automatically detects the type of traffic a connection is carrying. The cell queue controller (CQC) 210 has a counter per VC 204 that is incremented with every non-EOF cell, and is cleared with every EOF cell. The maximum frame size for AAL5 is 65535 bytes, or about 1366 cells. For one embodiment, if the cell count exceeds a predetermined threshold value such as 1366, then EPD is disabled. As long as the cell count is below the predetermined threshold value such as 1366, EPD is enabled.

In a further embodiment, the control plane for the cell queue controller (CQC) 210 polls the VC 204 for the number of user data cells and number of EOF cells received in the last interval. If there are no EOF cells, and the number of user data cells exceeds the predetermined threshold value such as 1366, EPD is configured to off. If at least one EOF cell was received, EPD is configured to on. Otherwise, the EPD configuration is not changed.

If the number of data cells is less than the predetermined threshold value such as 1366 and no EOF cell was received, either the sample interval may be increased or the number of data cells received across multiple sample intervals may be accumulated. This is possible to achieve by maintaining the counter value (i.e. not clearing the counter) when the connection is polled and no EOF is detected. This ensures the reliable detection of low-speed non-packet based traffic.

In both embodiments, the pre-determined threshold value may be set higher to accommodate the possibility of an upstream mechanism that is discarding discrete cells.

Figure 3:
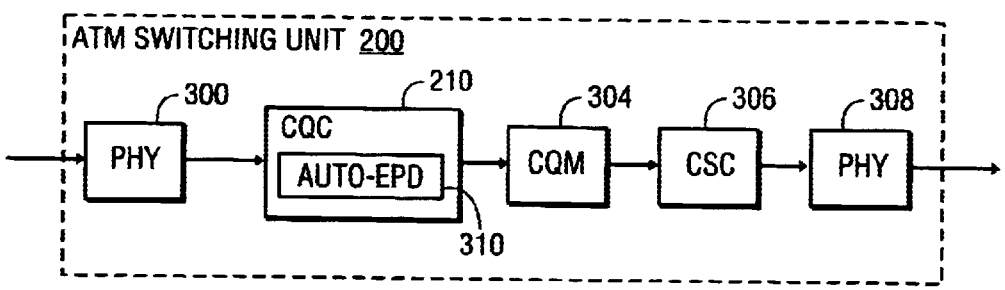
FIG. 3 illustrates an exemplary block diagram of an ATM switch comprising an auto-EPD mechanism.

FIG. 3 is an exemplary block diagram of one embodiment of an ATM Wide Area Network (WAN) switch with the auto-EPD mechanism.

An auto-EPD mechanism 310 is implemented in network communication equipment such as an ATM switching unit 200. More specifically, ATM switching unit 200 is comprised of a PHY 300 and PHY 308 that represent the Physical layer to ATM layer or ATM layer to Physical layer adaption controller. The cell queue controller (CQC) 210 determines in which queue to store the cell and whether to accept or discard the cell. A cell queue memory (CQM) 304 stores the accepted ATM cells in service queues and retrieves cells upon the service decision by a call service controller (CSC) 306. The CSC 306 determines which cell to send to which PHY (300 or 308).

For one embodiment, the auto-EPD mechanism 310 resides in the CQC 210. If the CQC 210 determines to discard the cell such as due to contract violation or service queue/PHY congestion, the auto-EPD mechanism 310 can force a discard of the remaining cells of the corresponding packet.

Figure 4:
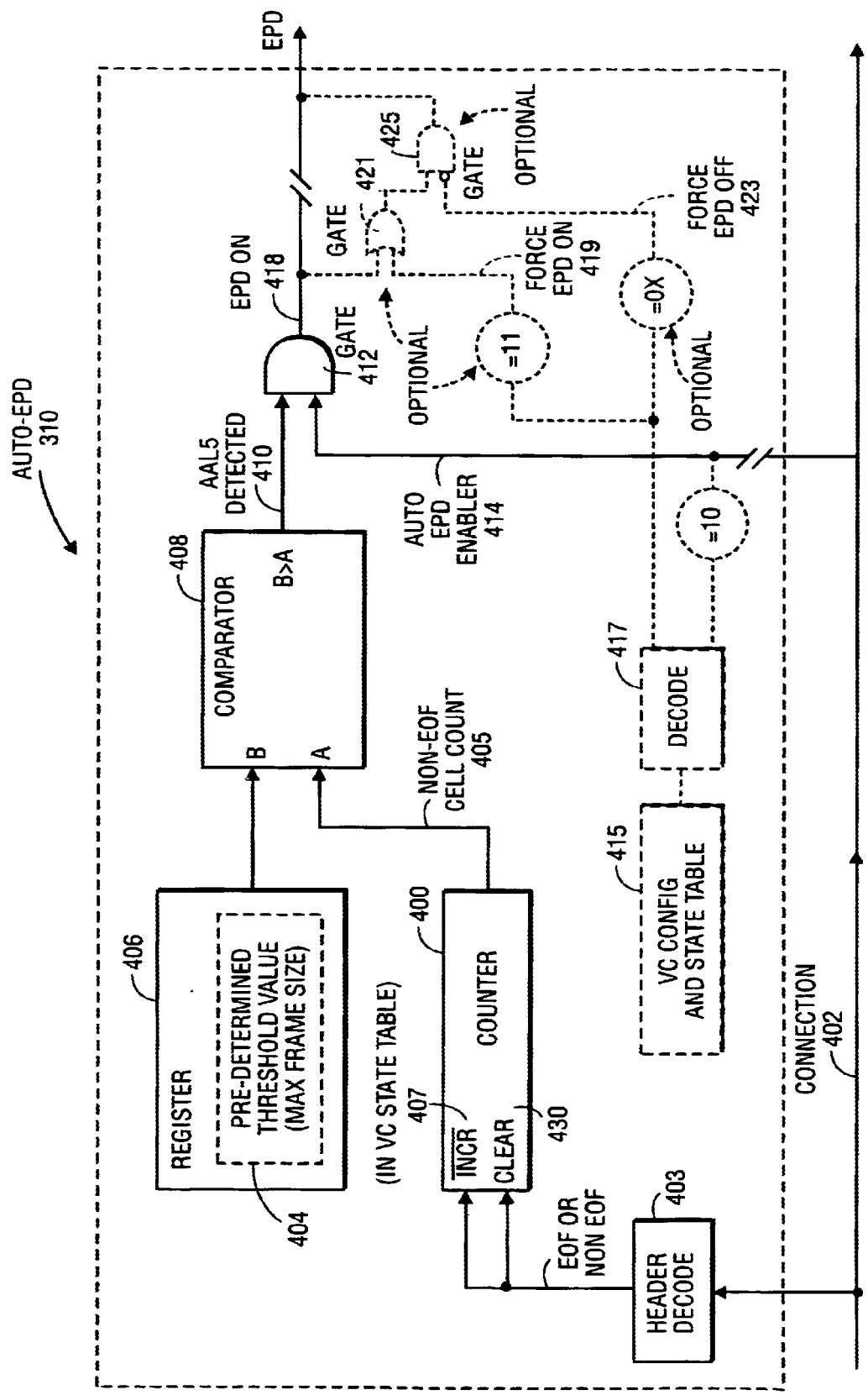
FIG. 4 is an exemplary embodiment of the auto-EPD mechanism.

FIG. 4 illustrates an exemplary embodiment of the auto-EPD mechanism 310. EPD may operate in three modes, namely static EPD off, static EPD on or auto-EPD. For one embodiment, there is one bit that is programmed per VC 204 that indicates whether EPD should be statically enabled on that VC 204 (i.e. static EPD off or on) or based on an auto-EPD mode. Additionally, there is a bit that is programmed per VC 204 that indicates that the EPD is to be disabled altogether. Each entry in the VC configuration and status tables 415 (further illustrated in FIG. 5b) includes an exemplary configuration bit which may be programmed for each VC to indicate EPD enablement configuration of static EPD on, off and auto-EPD. The auto-EPD mechanism is enabled when a VC 204 is programmed to be in an auto-EPD mode.

More specifically, data cells are received on a connection 402. A header decode 403 detects an End Of Frame (EOF) cell by decoding the Payload Type Indicator (PTI) field of a cell header. If the data cell on the connection 402 is an EOF cell, then a count value of a cell counter 400 is cleared (430). Otherwise, if the data cell is a non-EOF data cell, then the cell counter 400 is incremented (407). A predetermined value of the (non-EOF) data cell count is assigned and held as a pre-determined threshold value 404 in a register 406.

For one embodiment, a maximum non-EOF cell count of 2K may be assigned which indicates that a data packet should not be greater than 2K. If the count exceeds this pre-programmed threshold value 404 then the traffic is deemed not to be an AAL5 traffic.

For one embodiment, a comparator 408 compares the pre-determined threshold 404 with the cell count 405. The output of the comparator 408 indicating an "AAL5 detected signal" 410 is input to an AND gate 412 along with an auto-EPD enable signal 414. The auto-EPD enable signal 414 is output by a decode 417 of the VC configuration as determined by VC configuration and state tables 415. The VC configuration determines whether the EPD feature is statically disabled or enabled or whether auto-EPD mode is enabled. If the cell count 405 is above the predetermined threshold value 404, then the traffic is deemed not to be an AAL5 traffic and thus EPD is not enabled as indicated by a disabled EPD on signal 418.

Otherwise, the traffic is deemed to be AAL5 traffic and if the auto-EPD mechanism is programmed to be on (auto-EPD mode on), then the EPD feature is enabled as indicated by the enabled EPD on signal 418.

Additional decodes (417) of the VC configuration may statically enable or disable the EPD feature, regardless of the AAL5 detection logic by decode of entries from the VC configuration table 415. For example, if the decode of a given VC entry in the VC configuration table 415 is "11", the static EPD on is enabled and EPD is forced to be on (419).

For one embodiment, a logic gate such as an OR gate 421 is implemented to accept the "11" input along with the EPD on signal 418 to force EPD on. Further, a decode 417 may output a value indicative of a static EPD off (force EPD off) 423 such as "0X". For one embodiment, a logic gate 425 may accept "0X" and the output of logic gate 421 to force EPD off. In either case, the value indicative of static EPD on, off and auto-EPD may vary. In addition, the embodiment is not limited to the logic gates 421 and 425 illustrated in FIG. 4.

Figures 5A, 5B:
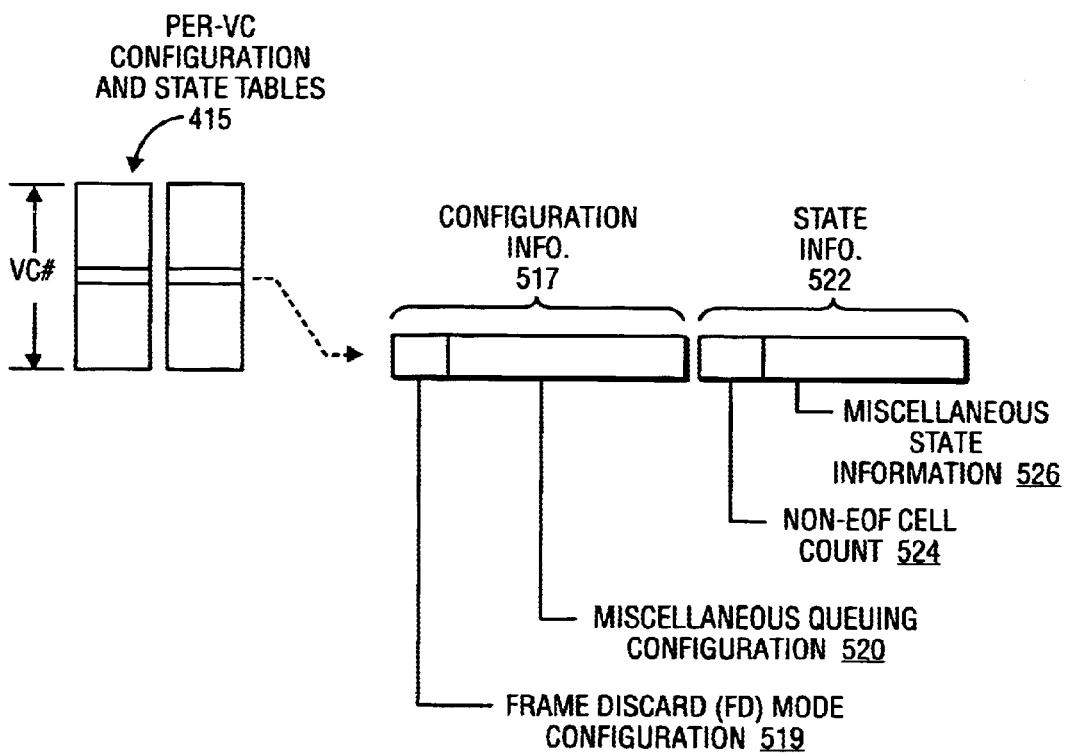
FIG. 5a is one embodiment of a frame based decision matrix illustrating the decision logic that determines whether a connection is frame based.
FIG. 5b is one embodiment of VC configuration and status information tables.

FIG. 5a is an example of an EPD configuration encoding matrix for programming the EPD mode per VC. For one embodiment, if only auto-EPD is used, no per-VC configuration is required. In an alternate embodiment, a pre-programmable DIS_AUTO_EPD bit 502 of a VC is used to enable or disable the frame-based auto-EPD mechanism. Once the DIS_AUTO_EPD bit 502 is pre-programmed to be on, a FD_ENB bit 504 of a VC is used to determine whether or not any EPD functionality is enabled on the VC according to the illustrated matrix 500. The FD_ENB bit 504 and DIS_AUTO_EPD bit 502 are configured per VC.

FIG. 5b illustrates an exemplary embodiment of VC configuration and state tables. As an option to have the EPD feature disabled altogether (i.e. no auto-EPD) or enabled altogether (also no auto-EPD), the auto-EPD mechanism checks the VC configuration and state tables 415 to determine the pre-configured VC state.

An entry for each VC is provided in the VC configuration and state tables 415. Each entry has configuration information 517 that includes a frame discard (FD) mode configuration 519 and a miscellaneous queuing configuration 520. The FD mode configuration 519 indicates whether a VC is altogether EPD disabled or enabled. A state information 522 includes a non-EOF cell count 524 and a miscellaneous state information 526.

Figure 6A:
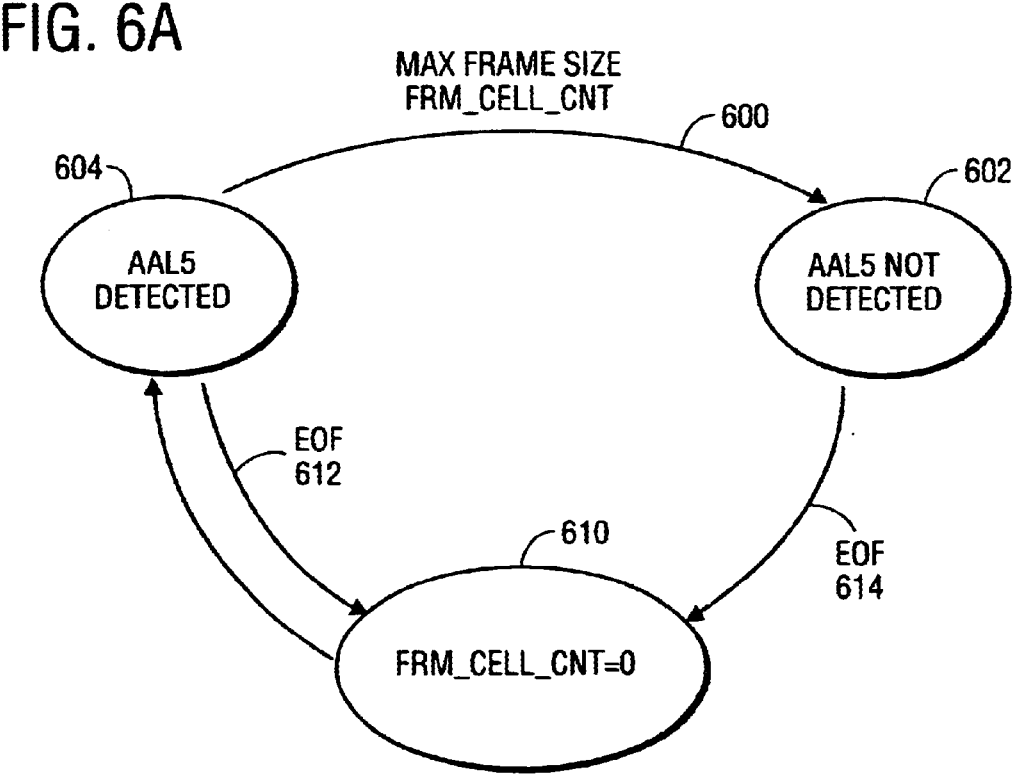
FIGS. 6a and 6b are exemplary auto-EPD state machines illustrating one embodiment of the process followed by the auto-EPD mechanism.
Figure 6B:
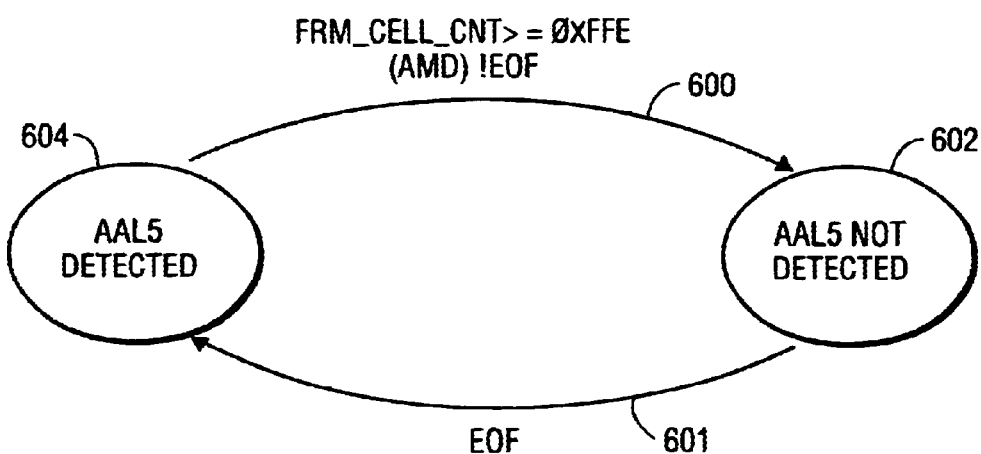

FIGS. 6a and 6b are exemplary auto-EPD state machines. If the nature of a connection is not known at connection set up time, the auto-EPD mechanism can be enabled which will automatically detect when the user traffic type changes and respond accordingly.

As illustrated in FIG. 6a, if the auto-EPD mechanism is enabled, the cell counter 400 counts every non-EOF data cell that arrives on the connection. If the data cell count reaches a configurable predetermined threshold value (MAX FRAME SIZE 600) such as 1366 cells, the value saturates and the CQC 210 assumes the connection is non-frame based 602 (AAL5 not detected). If an EOF cell arrives (EOF 612 or 614), the count is reset to an initial value such as 0×00 in state 610 (FRM_CELL_CNT=0) and the connection is assumed to be frame based 604 (AAL5 detected).

In an alternate embodiment illustrated in FIG. 6b, the network connection is polled for the number of user data cells and for the number of EOF cells received in the last interval. If there are no EOF cells, and the number of user data cells exceeds a predetermined threshold value (such as 1366), EPD is configured to off. If at least one EOF cell was received, EPD is configured to on in state 604 (AAL5 detected). Otherwise, the EPD configuration is not changed. If the number of data cells is less than the predetermined threshold value and no EOF cell was received, the sample interval may be increased or the number of data cells received across multiple sample intervals may be accumulated by maintaining the counter value (i.e., not clearing the counter) when the connection is polled and no EOF is detected. This ensures the reliable detection of low-speed non-packet based traffic.

In the CQC 210, every cell received is evaluated for acceptance based on contract and congestion conditions. If a cell is discarded and the VC is operating in an EPD mode, subsequent cells may be discarded due to a given EPD criterion of discard. An exemplary EPD criterion of discard for use with the auto-EPD mechanism is discussed in the text accompanying FIG. 7 as follows.

Figure 7:
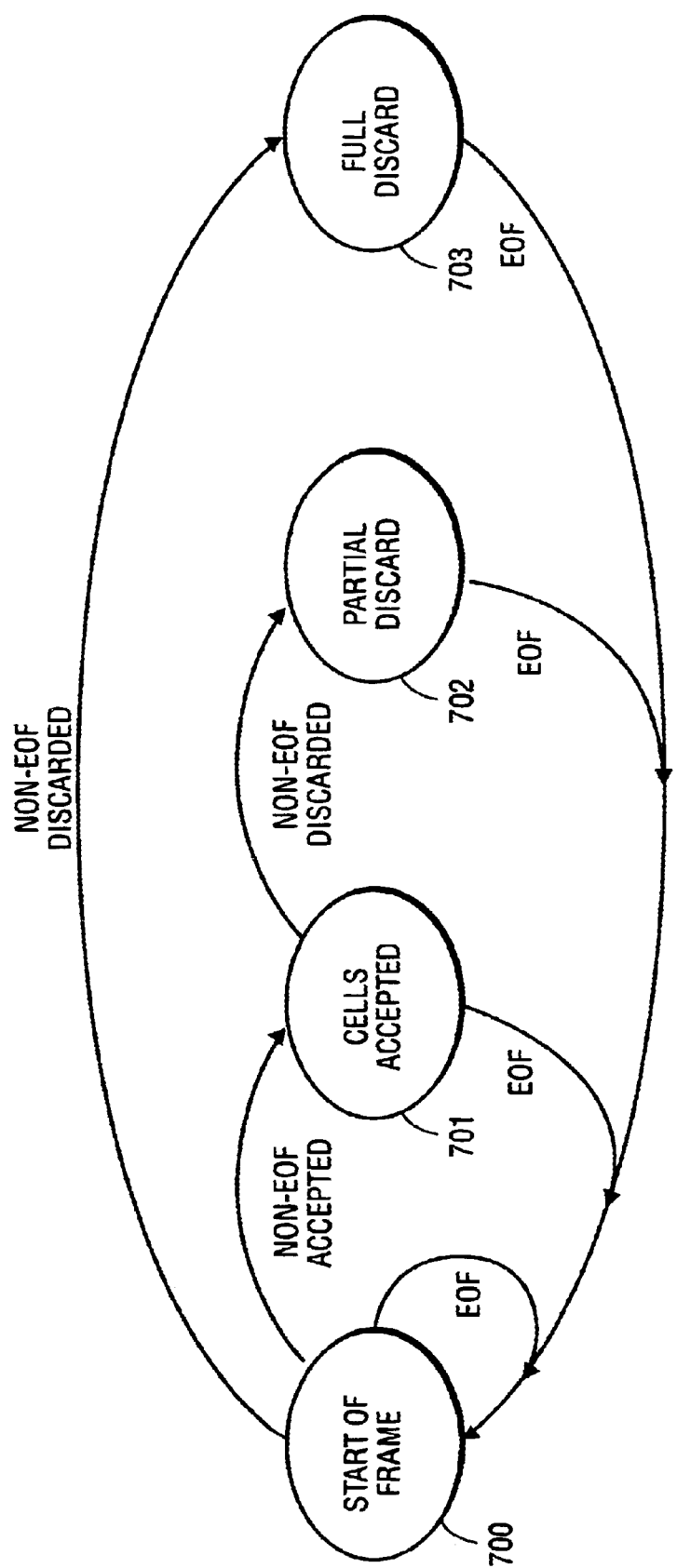
FIG. 7 is a state machine illustrating exemplary EPD criteria of discard.

FIG. 7 is a state machine illustrating one embodiment of the auto-EPD mechanism's criteria of discard. The state diagram has four states which may be associated with a VC, namely, a waiting for start of frame state 700, a cells accepted state 701, a partial discard state 702 and a full discard state 703. For one embodiment, the VC states are maintained in two status bits associated with each VC.

In full discard 703, if a Start Of Frame cell (SOF) is discarded, then the entire frame including the EOF is to be discarded. An SOF is the start of frame cell that is the first data cell after an EOF. In the partial discard 702, if the cell which is discarded is some cell after the SOF, then every cell up to but not including the EOF is to be discarded due to the partial discard state.

At the start of a given frame, if there is discard of a non-EOF cell, the state transitions from the start of frame state 700 to the full discard state 703. If a non-EOF cell is accepted, then the state transitions from the start of frame state 700 to the cells accepted state 701. Subsequently, on a non-EOF cell discard, the state transitions to a partial discard state 702. The state machine then returns to the start of frame state 700 when an EOF is received.

What has been described is auto-EPD mechanism for automatically enabling AAL5 EPD on an ATM network. The embodiments are applicable to any network application that makes a decision to accept or discard a cell. For example, discard may be necessary due to an accruing mechanism of threshold overflow. Alternatively, discard may be necessary due to policing in which traffic contracts are enforced.

The potential for discarding a cell exists at any point at which traffic is routed to another location via a connection such as a VC. One embodiment monitors the number of cells that arrive, clears the cell count every time an end of frame is received that exceeds a predetermined threshold and the EPD is enabled. The EPD criterion is determined and the traffic is processed for either partial packet or full packet discard or a cell accept mode.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:

1. A method for automatically enabling early packet discard mode on a cell switching network comprising:
    counting every non-end of the frame data cell that arrives on a network connection;
    comparing the number of non-end of the frame data cell resulting from the counting to a predetermined threshold value to determine whether traffic arriving on the network connection is a frame based traffic; and
    enabling early packet discard if the traffic is frame based.

2. The method of claim 1 further comprising determining that traffic on the network connection is non-frame based if the data cell count reaches the predetermined threshold value.

3. The method of claim 2 further comprising determining that traffic on the network connection is frame based if an end of the frame cell arrives before the data cell count reaches the predetermined threshold value.

4. The method of claim 3 further comprising enabling the early packet discard to on if the end of the frame cell arrives before the data cell reaches the predetermined threshold value.

5. The method of claim 3 further comprising resetting the count to a predetermined initial value if the end of the frame cell arrives before the data cell reaches the predetermined threshold value.

6. The method of claim 5 further comprising polling the network connection for the number of data cells and the number of end of the frame cells received in a predetermined interval.

7. The method of claim 6 further comprising configuring the early packet discard to off if there are no end of the frame cells, and the number of user data cells exceeds a predetermined threshold value.

8. The method of claim 7 further comprising configuring the early packet discard to on if at least one end of the frame cell is received at the network connection.

9. An apparatus for automatically enabling early packet discard mode on a cell switching network comprising:
   a register coupled to a comparator and configured to hold a pre-determined threshold value for non-end of the frame data cell count arriving on a virtual connection;
   a cell counter per virtual connection, the cell counter coupled to the comparator and configured to count the number of non-end of the frame data cells which arrive on the virtual connection; and
   the comparator coupled to the register and the cell counter and configured to compare the pre-determined threshold value with the number of non-end of the frame data cells and responsively output a frame based traffic detect signal to automatically enable or disable the early packet discard.

10. The apparatus of claim 9 wherein the pre-determined threshold value is indicative of a maximum frame size.

11. The apparatus of claim 10 wherein the cell counter is configured to initialize if the cell counter detects an end of the frame data cell.

12. The apparatus of claim 11 wherein the comparator outputs an enabled frame based traffic detect signal if the data cell count value is less than the pre-determined threshold value.

13. The apparatus of claim 12 further comprising a virtual connection configuration and status information table configured to hold one entry for each virtual connection, each the entry having an early packet discard enablement bit that is programmed per virtual connection that indicates whether the early packet discard is to be disabled or enabled altogether or enabled in an auto-early packet discard mode.

14. The apparatus of claim 13 further comprising a decoder coupled to the virtual connection configuration and status information table configured to decode the early packet discard enablement bit for a given virtual connection and output a corresponding early packet discard enable signal.

15. The apparatus of claim 14 further comprising a first logic gate coupled to the comparator and configured to accept the frame based traffic detect signal and the auto early packet discard enable signal.

16. The apparatus of claim 15 wherein the first logic gate is configured to output an early packet discard on signal if the frame based traffic detect signal indicates that the data cell count value is less than the predetermined threshold value and the early packet discard enable signal is on.

17. The apparatus of claim 16 further comprising a second logic gate coupled to the first logic gate configured to accept the early packet discard on signal and a static early packet discard configuration signal, the static early packet discard configuration signal over-riding the early packet discard on signal and enabling or disabling the early packet discard according to a static early packet discard configuration indicated by the static early packet discard configuration signal.

18. A network communication system implemented with an auto early packet discard mechanism for automatically enabling and disabling early packet discard on a cell switching network comprising:
   a physical layer adaption controller configured to interface with a cell switching network layer and transfer data cells in and out of the network communication system;
   a cell queue controller coupled to the physical layer adaption controller and configured to determine whether to accept the data cells, the auto early packet discard mechanism residing in the cell queue controller and configured to automatically determine whether to enable the early packet discard according to traffic type of the data cells;
   a counter implemented in the cell queue controller that is incremented with every non-end of frame cell and is cleared with every end of frame cell;
   a cell queue memory coupled to the cell queue controller and configured to store the accepted data cells in service queues; and
   a call service controller coupled to the cell queue memory and the physical layer adaption controller and configured to determine which cell to send to the physical layer adaption controller.

19. The system of claim 18 comprising an asynchronous transfer mode switching unit.

20. The system of claim 19 wherein the auto-early packet discard mechanism comprises:
   a register coupled to a comparator and configured to hold a pre-determined threshold value for non-end of the frame data cell count arriving on a virtual connection;
   a cell counter per virtual connection, the cell counter coupled to the comparator and configured to count the number of non-end of the frame data cells which arrive on the virtual connection; and
   the comparator coupled to the register and the cell counter and configured to compare the pre-determined threshold value with the number of non-end of the frame data cells and responsively output a frame based traffic detect signal to automatically enable or disable the early packet discard.

21. The system of claim 20 wherein the pre-determined threshold value is indicative of a maximum frame size.

22. The system of claim 21 wherein the cell counter is configured to initialize if the cell counter detects an end of the frame data cell.

23. The system of claim 22 wherein the comparator outputs an enabled frame based traffic detect signal if the data cell count value is less than the pre-determined threshold value.

24. The system of claim 23 further comprising a virtual connection configuration and status information table configured to hold one entry for each virtual connection, each the entry having an early packet discard enablement bit that is programmed per virtual connection that indicates whether the early packet discard is to be disabled or enabled altogether or enabled in an auto-early packet discard mode.

25. The system of claim 24 further comprising a decoder coupled to the virtual connection configuration and status information table configured to decode the early packet discard enablement bit for a given virtual connection and output a corresponding early packet discard enable signal.

26. The system of claim 25 further comprising a first logic gate coupled to the comparator and configured to accept the frame based traffic detect signal and the auto early packet discard enable signal.

27. The system of claim 26 wherein the first logic gate outputs an early packet discard on signal if the frame based traffic detect signal indicates that the data cell count value is less than the predetermined threshold value and the early packet discard enable signal is on.

28. The system of claim 27 further comprising a second logic gate coupled to the first logic gate configured to accept the early packet discard on signal and a static early packet discard configuration signal, the static early packet discard configuration signal over-riding the early packet discard on signal and enabling or disabling the early packet discard according to a static early packet discard configuration indicated by the static early packet discard configuration signal.

29. An apparatus for automatically enabling early packet discard mode on a cell switching network comprising:
  means for holding a pre-determined threshold value for non-end of the frame data cell count arriving on a virtual connection;
  means for counting the number of non-end of the frame data cells which arrive on the virtual connection, the means for counting coupled to the means for holding; and
  means for comparing the pre-determined threshold value with the number of non-end of the frame data cells and responsively outputting a frame based traffic detect signal to automatically enable or disable the early packet discard.

30. The apparatus of claim 29 wherein the pre-determined threshold value is indicative of a maximum frame size.

31. The apparatus of claim 30 wherein the means for counting is configured to initialize if the cell counter detects an end of the frame data cell.

32. The apparatus of claim 31 wherein the means for comparing outputs an enabled frame based traffic detect signal if the data cell count value is less than the predetermined threshold value.

33. The apparatus of claim 32 further comprising means for storing one entry for each virtual connection, each the entry having an early packet discard enablement bit that is programmed per virtual connection that indicates whether the early packet discard is to be disabled or enabled altogether or enabled in an auto-early packet discard mode.

34. The apparatus of claim 33 further comprising means for decoding coupled to the means for storing and configured to decode the early packet discard enablement bit for a given virtual connection and output a corresponding early packet discard enable signal.

35. The apparatus of claim 34 further comprises first means for accepting the frame based traffic detect signal and the auto early packet discard enable signal.

36. The apparatus of claim 35 wherein the first means for accepting is configured to output an early packet discard on signal if the frame based traffic detect signal indicates that the data cell count value is less than the predetermined threshold value and the early packet discard enable signal is on.

37. The apparatus of claim 36 further comprising a second means for accepting coupled to the first means for accepting and configured to accept the early packet discard on signal and a static early packet discard configuration signal, the static early packet discard configuration signal over-riding the early packet discard on signal and enabling or disabling the early packet discard according to a static early packet discard configuration indicated by the static early packet discard configuration signal.

38. A machine-readable medium that provides instructions, which when executed by a machine, cause said machine to perform operations comprising:
  counting every non-end of the frame data cell that arrives on a network connection;
  comparing the number of non-end of the frame data cell resulting from the counting to a predetermined threshold value to determine whether traffic arriving on the network connection is a frame based traffic; and
  enabling early packet discard if the traffic is frame based.

39. The machine readable medium of claim 38, wherein the operations further comprise determining that traffic on the network connection is non-frame based if the data cell count reaches the predetermined threshold value.

40. The machine readable medium of claim 39, wherein the operations further comprise determining that traffic on the network connection is frame based if an end of the frame cell arrives before the data cell count reaches the predetermined threshold value.

41. The machine readable medium of claim 40, wherein the operations further comprise enabling the early packet discard to on if the end of the frame cell arrives before the data cell reaches the predetermined threshold value.

42. The machine readable medium of claim 40, wherein the operations further comprise resetting the count to a predetermined initial value if the end of the frame cell arrives before the data cell reaches the predetermined threshold value.

43. The machine readable medium of claim 42, wherein the operations further comprise polling the network connection for the number of data cells and the number of end of the frame cells received in a predetermined interval.

44. The machine-readable medium of claim 43, wherein the operations further comprise configuring the early packet discard to off if there are no end of the frame cells, and the number of user data cells exceeds a predetermined threshold value.

45. The machine readable medium of claim 44, wherein the operations further comprise configuring the early packet discard to on if at least one end of the frame cell is received at the network connection.

46. An Asynchronous Transfer Mode switch comprising:
  means for holding a pre-determined threshold value for non-end of the frame data cell count arriving on a virtual connection;
  means for counting the number of non-end of the frame data cells which arrive on the virtual connection, the means for counting coupled to the means for holding; and
  means for comparing the pre-determined threshold value with the number of non-end of the frame data cells and responsively outputting a frame based traffic detect signal to automatically enable or disable early packet discard.

47. The Asynchronous Transfer Mode switch of claim 46 wherein the pre-determined threshold value is indicative of a maximum frame size.

48. The Asynchronous Transfer Mode switch of claim 47 wherein the means for counting is configured to initialize if the cell counter detects an end of the frame data cell.

49. The Asynchronous Transfer Mode switch of claim 48 wherein the means for comparing outputs an enabled frame based traffic detect signal if the data cell count value is less than the predetermined threshold value.

50. The Asynchronous Transfer Mode switch of claim 49 further comprising means for storing one entry for each virtual connection, each entry having an early packet discard enablement bit that is programmed per virtual connection that indicates whether the early packet discard is to be disabled or enabled altogether or enabled in an auto-early packet discard mode.

51. The Asynchronous Transfer Mode switch of claim 50 further comprising means for decoding coupled to the means for storing and configured to decode the early packet discard enablement bit for a given virtual connection and output a corresponding early packet discard enable signal.

52. The Asynchronous Transfer Mode switch of claim 51 further comprising first means for accepting the frame based traffic detect signal and the auto early packet discard enable signal.

53. The Asynchronous Transfer Mode switch of claim 52 wherein the first means for accepting is configured to output an early packet discard on signal if the frame based traffic detect signal indicates that the data cell count value is less than the predetermined threshold value and the early packet discard enable signal is on.

54. The Asynchronous Transfer Mode switch of claim 53 further comprising a second means for accepting coupled to the first means for accepting and configured to accept the early packet discard on signal and a static early packet discard configuration signal, the static early packet discard configuration signal over-riding the early packet discard on signal and enabling or disabling the early packet discard according to a static early packet discard configuration indicated by the static early packet discard configuration signal.

* * * * *